US005353137A

United States Patent [19]

Tsuboyama et al.

[11] Patent Number: 5,353,137

[45] Date of Patent: Oct. 4, 1994

[54] LIQUID CRYSTAL APPARATUS

[75] Inventors: Akira Tsuboyama, Sagamihara; Akiko Ooki, Atsugi; Hiroshi Inoue, Kanazawa, all of Japan

[73] Assignee: Canon Kabushiki Kaisha, Tokyo, Japan

[21] Appl. No.: 183,902

[22] Filed: Jan. 21, 1994

Related U.S. Application Data

[60] Continuation of Ser. No. 847,764, Mar. 4, 1992, abandoned, which is a division of Ser. No. 378,827, Jul. 12, 1989, Pat. No. 5,124,820.

[30] Foreign Application Priority Data

Jul. 14, 1988 [JP] Japan ................................ 63-176591

[51] Int. Cl.[5] ................................................ G02F 1/13

[52] U.S. Cl. ......................................... 359/56; 359/89

[58] Field of Search ...................... 359/100, 56, 55, 84, 359/89

[56] References Cited

U.S. PATENT DOCUMENTS

| | | | |
|---|---|---|---|
| 4,697,887 | 10/1987 | Okada et al. | 350/350 S |
| 4,701,026 | 10/1987 | Yazaki et al. | 350/350 S |
| 4,770,502 | 9/1988 | Kitazima | 350/333 |
| 4,824,212 | 4/1989 | Taniguchi | 350/333 |
| 4,901,066 | 2/1990 | Kobayashi et al. | 350/350 S |
| 4,927,243 | 5/1990 | Taniguchi et al. | 350/350 S |
| 5,124,820 | 6/1992 | Tsuboyama et al. | 359/56 |

FOREIGN PATENT DOCUMENTS

| | | | |
|---|---|---|---|
| 0229647 | 7/1987 | European Pat. Off. . | |
| 62-09324 | 1/1987 | Japan | 350/350 S |
| 2185614 | 7/1987 | United Kingdom . | |

OTHER PUBLICATIONS

Pat. Abs. J. vol. 11, No. 129 (Apr. 1987) 61-272724.

*Primary Examiner*—Jerome Jackson
*Assistant Examiner*—Courtney A. Bowers
*Attorney, Agent, or Firm*—Fitzpatrick, Cella, Harper & Scinto

[57] ABSTRACT

A liquid crystal apparatus includes: a liquid crystal device comprising a group of first electrodes, a group of second electrodes intersecting the first electrodes, and a ferroelectric liquid crystal disposed between the group of first electrodes and the group of second electrodes so as to form a picture area comprising a pixel at each intersection of the first and second electrodes; and drive means for applying a scanning selection signal to the first electrodes N electrodes apart (N: a positive integer), and applying data signals through the second electrodes to all or a prescribed part of the pixels on a particular first electrode under application of the scanning selection signal so as to first form a dark state at said all or a prescribed part of the pixels on the particular first electrode and then form a bright state at a selected pixel among said all or a prescribed part of the pixels on the particular first electrode.

4 Claims, 7 Drawing Sheets

LIQUID CRYSTAL APPARATUS

This application is a continuation of application Ser. No. 07/847,764, filed Mar. 4, 1992, now abandoned, which is a division of application Ser. No. 378,827, filed Jul. 12, 1989, now U.S. Pat. No. 5,124,820, issued Jun. 23, 1992.

FIELD OF THE INVENTION AND RELATED ART

The present invention relates to a liquid crystal apparatus, particularly one using a ferroelectric liquid crystal.

Clark and Lagerwall have disclosed a surface-stabilized bistable ferroelectric liquid crystal in Applied Physics Letters, Vol. 36, No. 11 (Jun. 1, 1980), p.p. 899–901, and U.S. Pat. Nos. 4,367,924 and 4,563,059. The bistable ferroelectric liquid crystal has been realized by disposing a chiral smectic liquid crystal between a pair of substrates which are set to provide a spacing small enough to suppress the formation of a helical arrangement of liquid crystal molecules inherent to the bulk chiral smectic phase of the liquid crystal and aligning vertical molecular layers each composed of a plurality of liquid crystal molecules in one direction.

A display panel comprising such a ferroelectric liquid crystal may be driven by a multiplexing drive scheme as disclosed by, e.g., U.S. Pat. No. 4,655,561 to Kanbe, et al., to provide a display with a large number of pixels.

A ferroelectric liquid crystal as described above shows a responsive time which depends on the surrounding temperature, so that a driving pulse duration at a lower temperature is required to be longer than at a higher temperature. As a result, a drive frequency for forming one picture (frame frequency) is lowered at a lower temperature and generally lowered to a frame frequency as low as 1–30 Hz. For this reason, a display at a lower temperature is liable to cause "flickering" to provide a display image of a poor display quality.

SUMMARY OF THE INVENTION

An object of the present invention is to provide a liquid crystal apparatus having solved the above-mentioned problems, particularly the occurrence of flickering.

According to the present invention, there is provided a liquid crystal apparatus, comprising:

a liquid crystal device comprising a group of first electrodes, a group of second electrodes intersecting the first electrodes, and a ferroelectric liquid crystal disposed between the group of first electrodes and the group of second electrodes so as to form a picture area comprising a pixel at each intersection of the first and second electrodes; and drive means for applying a scanning selection signal to the first electrodes N electrodes apart (N: a positive integer), and applying data signals through the second electrodes to all or a prescribed part of the pixels on a particular first electrode under application of the scanning selection signal so as to first form a dark state at said all or a prescribed part of the pixels on the particular first electrode and then form a bright state at a selected pixel among said all or a prescribed part of the pixels on the particular first electrode.

These and other objects, features and advantages of the present invention will become more apparent upon a consideration of the following description of the preferred embodiments of the present invention taken in conjunction with the accompanying drawings.

DESCRIPTION OF PREFERRED EMBODIMENTS

Figure 1:
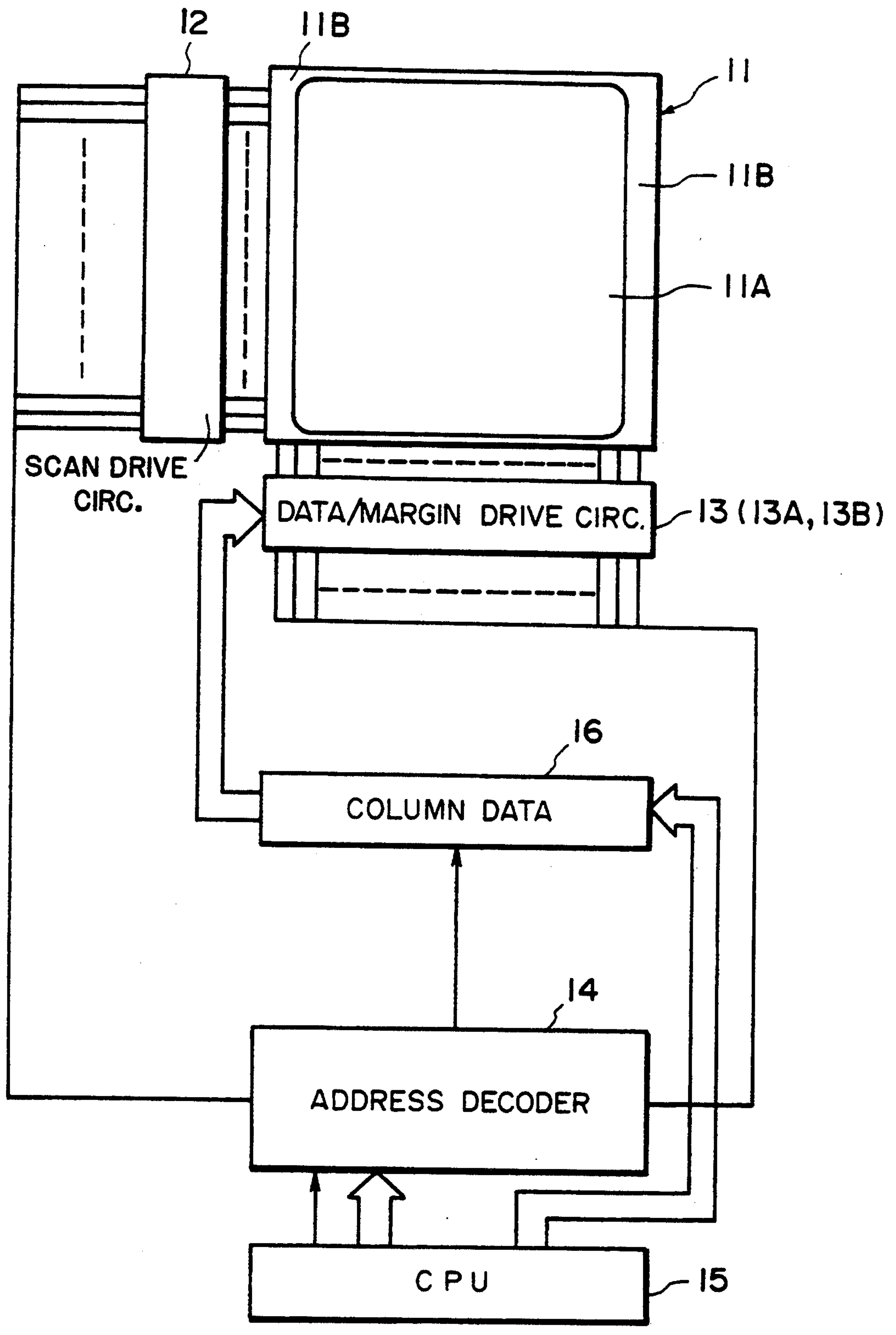
FIG. 1 is a block diagram of an apparatus according to the present invention.
Figure 2:
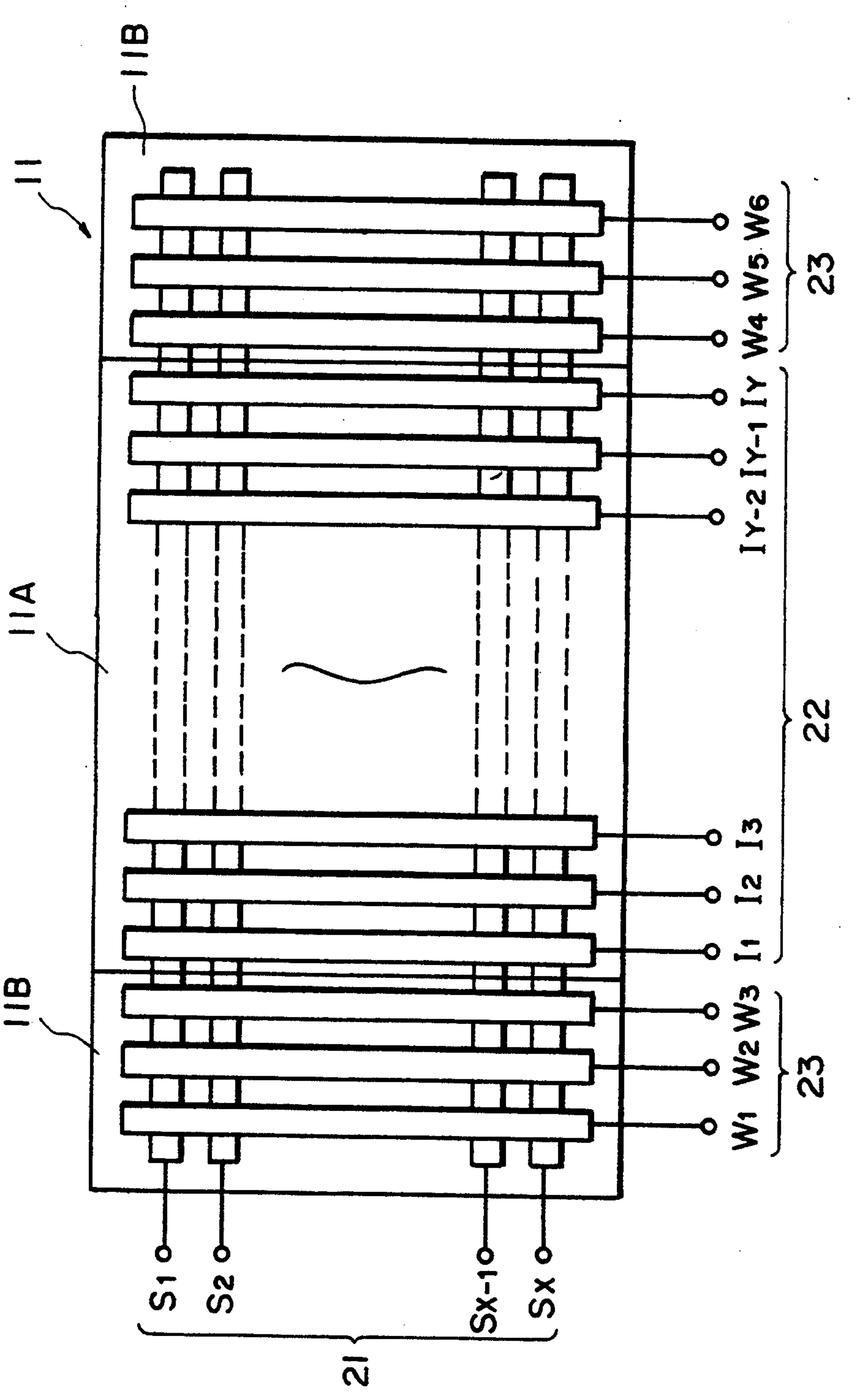
FIG. 2 is a schematic plan view of a matrix electrode structure used in the present invention.
Figure 3:
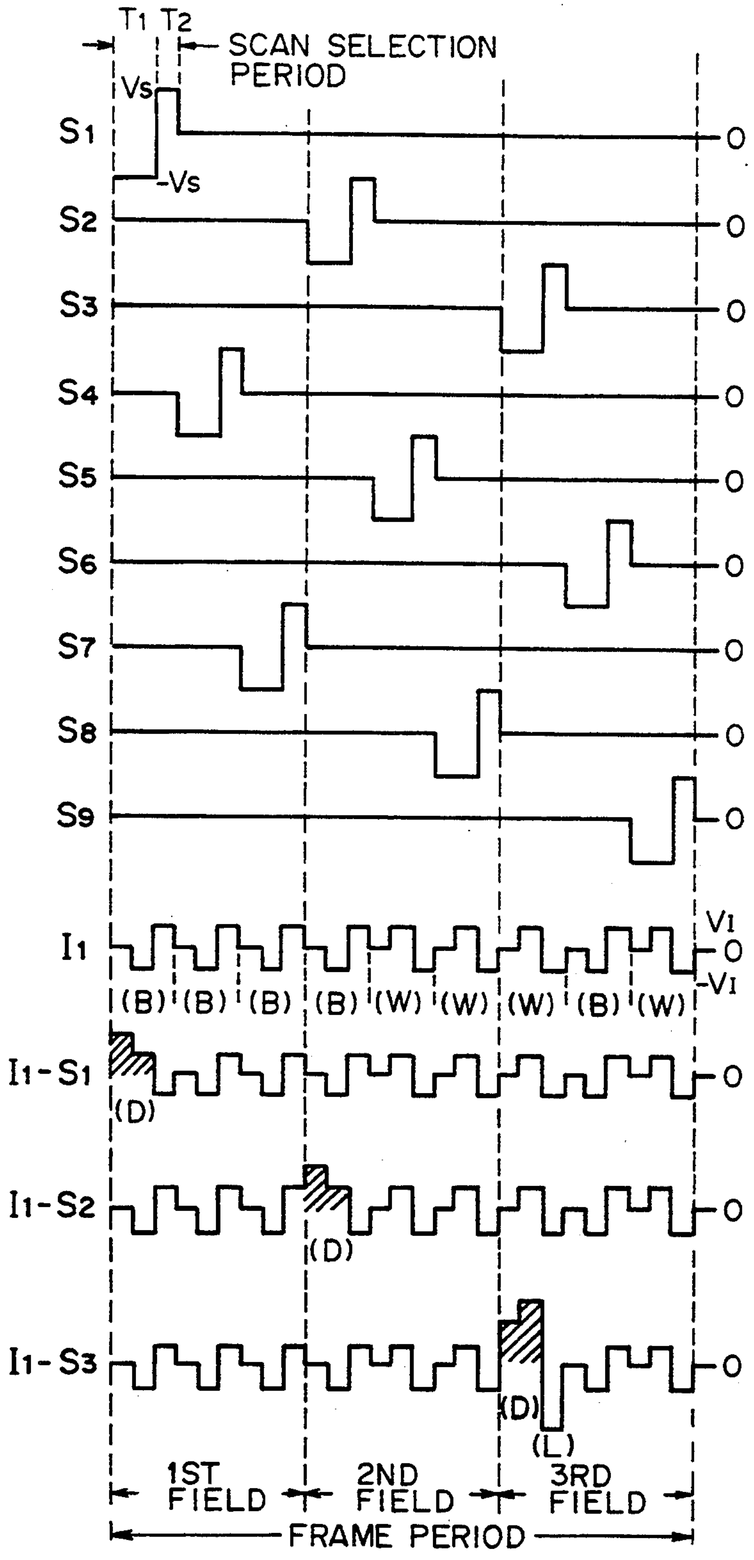
FIG. 3 shows a set of drive signal waveforms for multiplexing drive used in the present invention.

FIG. 1 is a block diagram of a liquid crystal apparatus according to the present invention. The apparatus includes a liquid crystal display panel 11 for providing a picture area or screen which comprises an image display area 11A for forming an image depending on data signals and a marginal region 11B which is a non-display region for not displaying an image. The liquid crystal display panel 11 is constituted by a ferroelectric liquid crystal and is provided with a drive unit therefor comprising a scanning drive circuit 12 and a data/margin drive circuit 13 which may in turn comprise a data drive circuit 13A and a margin drive circuit 13B. The image display region 11A may be driven by the scanning drive circuit 12 and the data drive circuit 13A and the marginal region(s) 11B may be driven by the scanning drive circuit 12 and the margin drive circuit 13B. Referring also to FIGS. 2 and 3, the scanning drive circuit 12 supplies scanning signals $S_1$, $S_2$, $S_3$, . . . , and the data/margin drive circuit 13 supplies data signals $I_1$, $I_2$, $I_3$, . . . and data signals for marginal display $W_1$, $W_2$, $W_3$ . . . The scanning drive circuit 12 and the data/margin drive circuit 13 are respectively addressed by an address decoder 14, and the data electrodes for applying data signals for marginal display 23 are also designated by the address decoder 14. Further, column data 16 are controlled by a CPU 15 and supplied to the data/margin drive circuit 13 so as to effect an image display in the image display region 11 and provide a uniformly bright or dark optical state at the marginal region 11B.

FIG. 2 illustrates a matrix electrode structure disposed on the liquid crystal display panel 11. In the image display region 11A in the liquid crystal display panel or picture area 11, pixels formed at the intersections of the scanning electrodes 21 and the data electrodes 22 are arranged in X rows and Y columns (X: number of scanning electrodes and Y: number of data electrodes), and in the marginal region(s) 11B, pixels formed at the intersections of the scanning electrodes 21 and the electrodes for marginal display 23 are arranged. The number of the electrodes for marginal display 23 should be determined so as to provide the marginal region with an appropriate width which may be several milli-meters to several centimeters.

Between the scanning electrodes 21 (first group) and the data electrodes 22 and electrodes for marginal display 23 (second group), a ferroelectric liquid crystal is disposed so as to provide a bright state (L) and a dark state (D) through application of driving signal waveforms as shown in FIG. 3.

According to a driving embodiment shown in FIG. 3, in a scanning selection period (in which a scanning selection signal is to be applied for selection of a scanning electrode) including a subperiod $T_1$ and a subperiod $T_2$, the pixels on a selected scanning electrode are simultaneously cleared into a dark optical state ("D" or black "B") in the period $T_1$ and a pixel selected therefrom is selectively switched into a bright optical state ("L" or white "W"). While the other non-selected pixels retain the dark optical state to effect writing on a scanning electrode. The above operation is repeated N electrodes apart (two lines apart, i.e., every third line, in this embodiment) in one series of scanning (one field scanning), and N+1 series of scanning (three times of field scanning in this embodiment) are performed to complete one cycle of scanning (one frame scanning) thereby forming one picture corresponding to given data signals. In the above-mentioned drive mode for display, cross nicol polarizers may be adjusted to set the optical state in the period T to be a dark state. In this instance, the frequency of the field scanning may be set to 20 Hz or higher, preferably 30 Hz or higher.

In the image display region 11A, an image is displayed depending on given data signals applied to the data electrodes 22. Further, the electrodes for marginal display are controlled so as to provide a bright (white) optical state uniformly at the pixels in the marginal region 11B while not shown in the figure.

Then, a liquid crystal panel having the following dimensions was subjected to image display according to the following Modes 1 and 2.

Liquid Crystal panel

Ferroelectric liquid crystal: "CS-1017" (trade name, available from Chisso K.K.)

Cell gap: 1.5 micron

Number of scanning electrodes: 400

Number of data electrodes: 640

Mode 1

One scanning period: 180 μsec

Drive voltages: $\pm V_S = \pm 18$ V $\pm V_I = \pm 6$ V

Mode 2

One scanning period: 400 μsec

Drive voltages: $\pm V_S = \pm 15$ V $\pm V_I = \pm 5$ V

The image forming operations according to the above mentioned Modes 1 and 2 were performed with skipping of different numbers of scanning electrodes and respectively subjected to evaluation by a panel composed of arbitrarily selected panelists. The results are summarized in the following Table 1 wherein ◎ denotes a case where all 20 panelists recognized no flickering: o, 15–19 panelists recognized no flickering: Δ, 15–19 panelists recognized flickering; and x, 20 panelists recognized flickering.

TABLE 1

| Mode | N (scanning N lines apart)<br>Spatial frequency (Hz) | 0<br>6.3 | 1<br>12.6 | 2<br>18.9 | 3<br>25.2 | 4<br>31.5 | 5<br>37.8 | 6<br>44.1 | 7<br>50.4 |
|---|---|---|---|---|---|---|---|---|---|
| 1 | Evaluation of flickering | Δ | ◎ | ◎ | ◎ | ◎ | ◎ | ◎ | ◎ |
| 2 | Evaluation of flickering | X | Δ | ○ | ◎ | ◎ | ◎ | ◎ | ◎ |

From the above results, it has been found that an image display free from flickering could be realized even at a low temperature, if the number N of skipped scanning electrodes was two or more, preferably three or more. No flickering was observed either in the marginal regions 11B.

Figure 4:
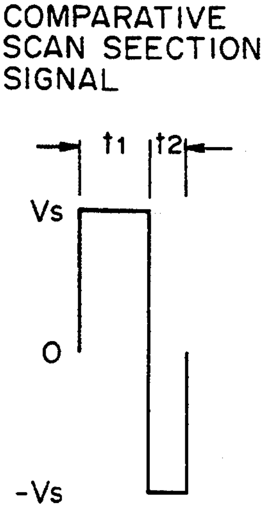
FIG. 4 shows a drive signal waveform of a comparative scanning selection signal.

Next, as a comparative test, the abovementioned image formation according to Mode 2 was repeated except that a scanning selection signal shown in FIG. 4 was used instead of the scanning selection signal shown in FIG. 3 (as a result, simultaneous erasure into a bright state was performed in a period $t_1$ corresponding to $T_1$ in FIG. 3 and selective writing into a dark state was performed in a period $t_2$ corresponding to $T_2$ in FIG. 3). The results of evaluation are summarized in the following Table 2 according to the same standards as in Table 1.

TABLE 2

| | Mode 2 | | | | | | | |
|---|---|---|---|---|---|---|---|---|
| N (scanning N lines apart) | 0 | 1 | 2 | 3 | 4 | 5 | 6 | 7 |
| Spatial frequency (Hz) | 6.3 | 12.6 | 18.9 | 25.2 | 31.5 | 37.8 | 44.1 | 50.4 |
| Evaluation of flickering | X | X | X | Δ | ○ | ◎ | ◎ | ◎ |

As shown in Table 2, flickering was much more noticeable than in the driving according to the driving waveforms shown in FIG. 3. In this comparative experiment, in addition to flickering, a fringe pattern formed by portions with different luminances occurred in parallel with the scanning lines in the cases of scanning selection four or more lines apart. This provided a poor display quality in a different sense from flickering.

Figure 5:
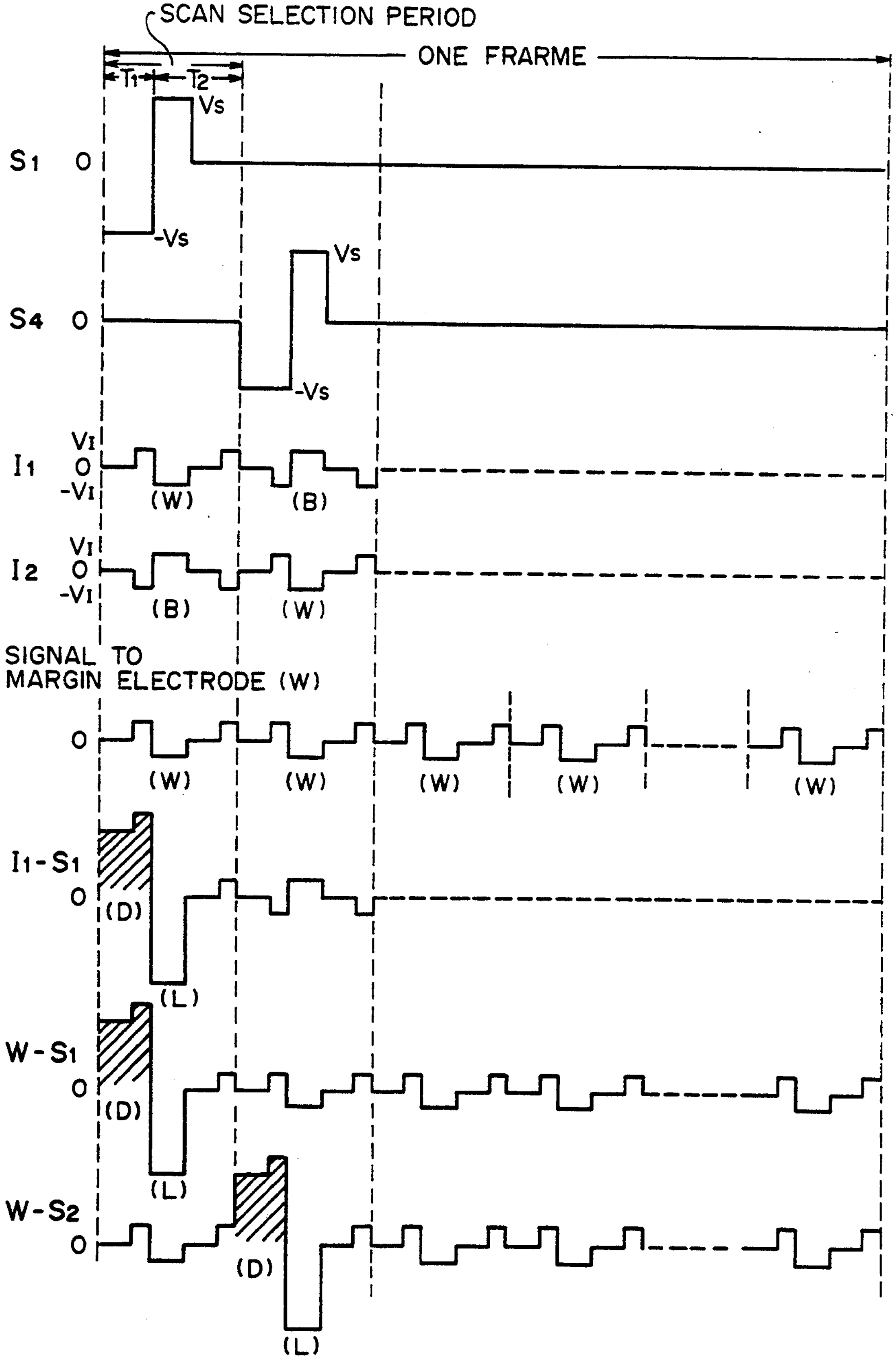
FIGS. 5 and 7 respectively show another set of drive signal waveforms for multiplexing drive used in the present invention.

FIG. 5 is a waveform diagram showing another set of driving signal waveforms used in another driving embodiment which is the same as the one explained with reference to FIG. 3 except that different waveforms of scanning selection signal and data signals are used (and also the order of data signals is arbitrary). In FIG. 5, data signals applied to the electrodes for marginal display are also shown.

Figure 6:
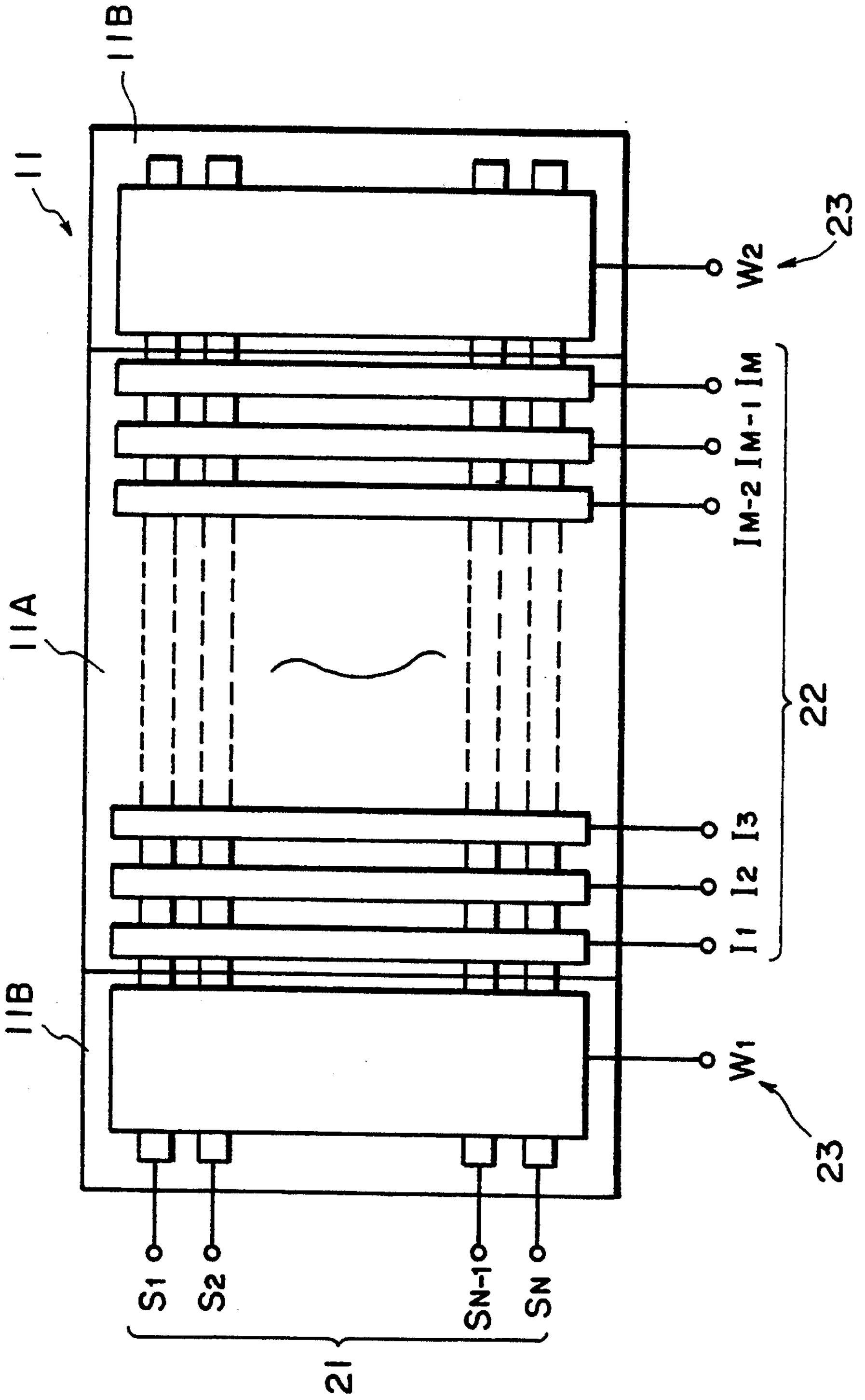
FIG. 6 is a schematic plan view of another matrix electrode structure used in the present invention.

FIG. 6 shows another embodiment of a matrix electrode structure for use in the present invention. In the embodiment shown in FIG. 6, an electrode for marginal display 23 having a larger width (preferably, several multi-meters to several centi-meters) than the width (generally 100–500 microns) of a data electrode 22, is used as electrodes $W_1$ and $W_2$ in the marginal regions 11B. As a result, the number of terminals can be remarkably decreased as compared with the embodiment shown in FIG. 2, whereby the IC designing for the data/margin drive circuit can be simplified.

Further, as a wider electrode for marginal display 23 is used, the capacitance for one electrode 23 is increased and a sufficiently large voltage may be required so as to exceed the threshold voltage of the liquid crystal layer. Accordingly, in a preferred driving embodiment using an electrode embodiment as shown in FIG. 6, a voltage signal having a duration $T_x$ which is longer than a maximum pulse duration $T_0$ of a data signal, may be used in synchronism with a scanning selection signal. A representative driving waveform example for this embodiment is shown in FIG. 7.

Figure 7:
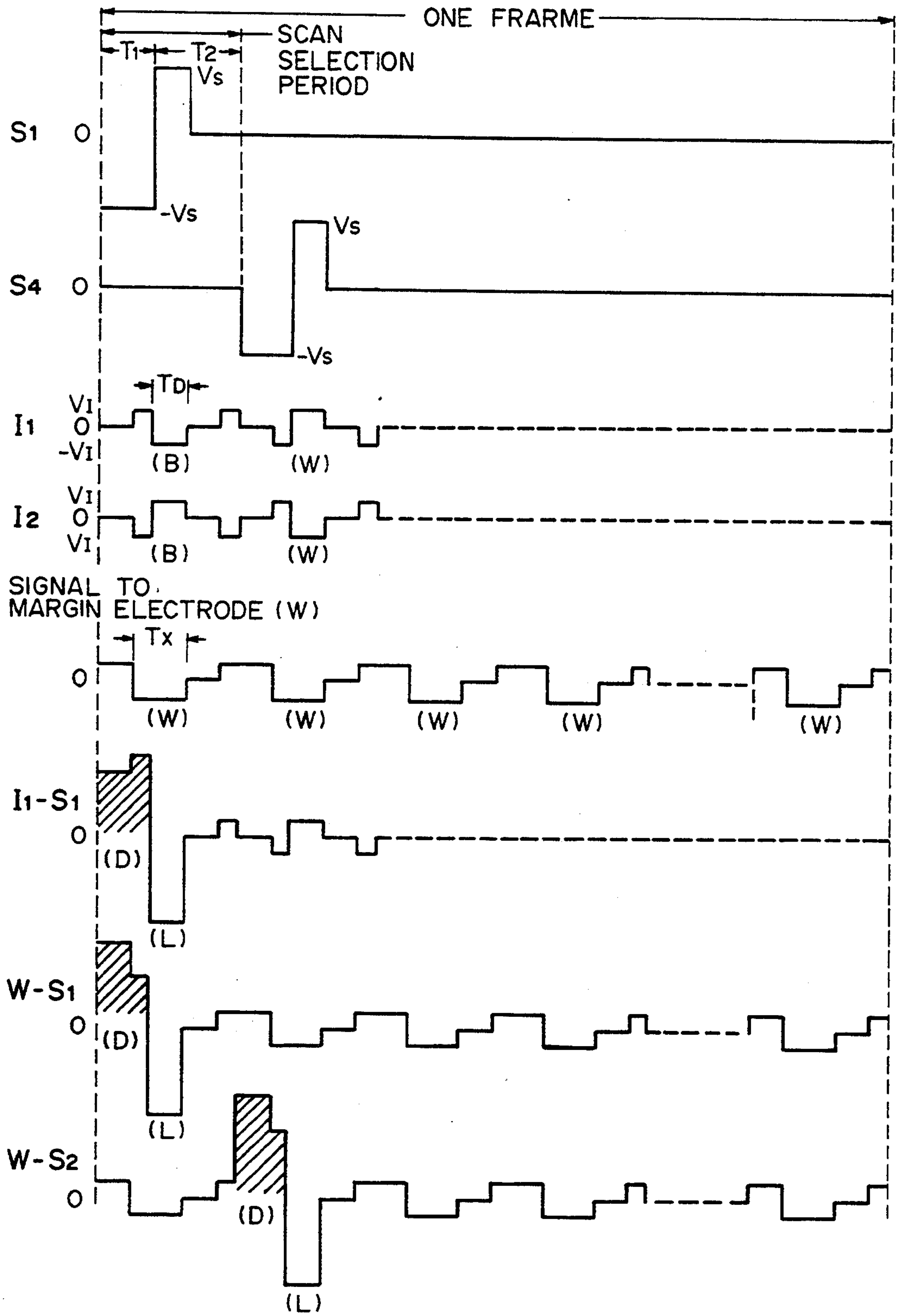

In a driving embodiment shown in FIG. 7, the scanning electrodes 21 and data electrodes 22 are driven similarly as in the embodiment shown in FIG. 5, but a voltage signal applied to an electrode for marginal display 23 has a pulse duration $T_x$ which is 3/2 times a maximum pulse duration $T_0$ of a data signal $I_1, I_2 \ldots$ By applying such a broad pulse voltage signal to the electrode for marginal display 23, the marginal region 11B can be securely controlled to a uniform bright state.

Figure 8:
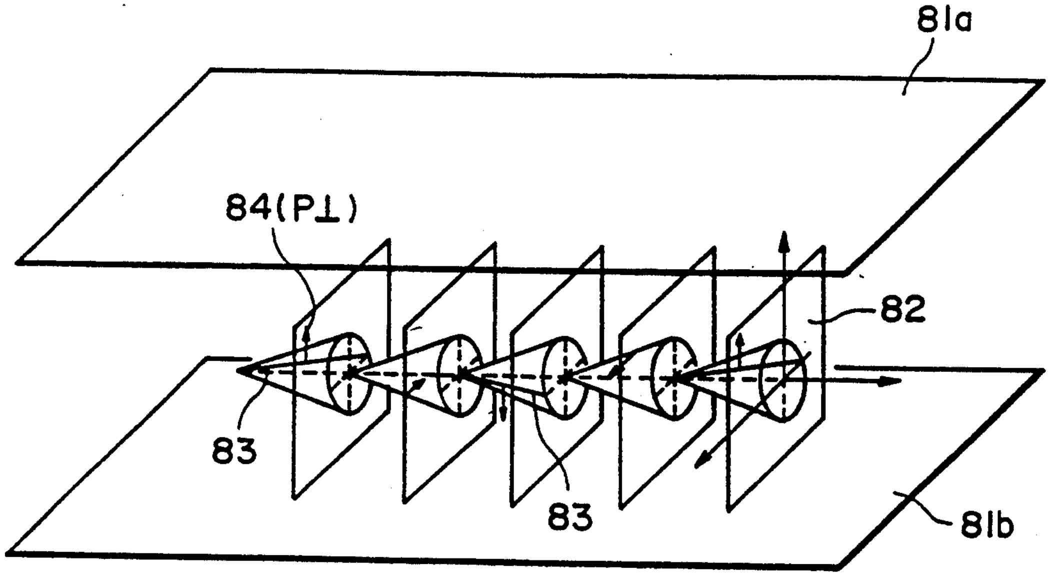
FIGS. 8 and 9 are schematic perspective views for illustrating ferroelectric liquid crystal cells used in the present invention.
Figure 9:
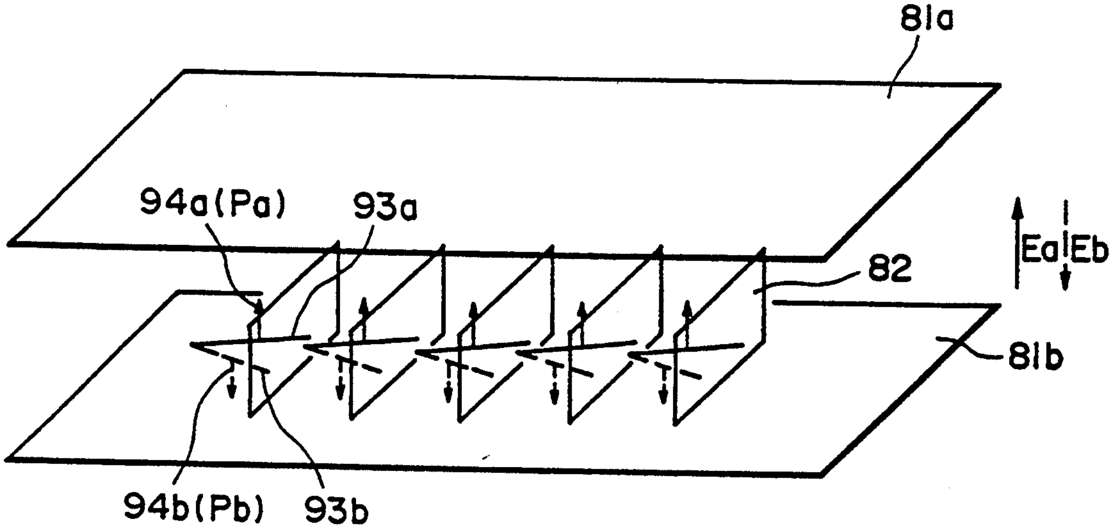

Referring to FIG. 8, there is schematically shown an example of a ferroelectric liquid crystal cell. Reference numerals 81*a* and 81*b* denote substrates (glass plates) on which a transparent electrode of, e.g., $In_2O_3$, $SnO_2$, ITO (indium-tin-oxide), etc., is disposed, respectively. A liquid crystal of an SmC*-phase in which liquid crystal molecular layers 82 are oriented perpendicular to surfaces of the glass plates is hermetically disposed therebetween. A full line 83 shows liquid crystal molecules. Each liquid crystal molecule 83 has a dipole moment ($P_\perp$) 84 in a direction perpendicular to the axis thereof. When a voltage higher than a certain threshold level is applied between electrodes formed on the base plates 81*a* and 81*b*, a helical or spiral structure of the liquid crystal molecule 83 is unwound or released to change the alignment direction of respective liquid crystal molecules 83 so that the dipole moment ($P_\perp$) 84 are all directed in the direction of the electric field. The liquid crystal molecules 83 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage. Further, when the thickness of the liquid crystal cell is sufficiently thin (e.g., 1 micron), the helical structure of the liquid crystal molecules is released without application of an electric field whereby the dipole moment assumes either of the two states, i.e., Pa in an upper direction 94*a* or Pb in a lower direction 94*b* thus providing a bistability condition, as shown in FIG. 9. When an electric field Ea or Eb higher than a certain threshold level and different from each other in polarity as shown in FIG. 9 is applied to a cell having the above-mentioned characteristics, the dipole moment is directed either in the upper direction 94*a* or in the lower direction 94*b* depending on the vector of the electric field Ea or Eb. In correspondence with this, the liquid crystal molecules are oriented to either a first orientation state 93*a* or a second orientation state 93*b*.

When the above-mentioned ferroelectric liquid crystal is used as an optical modulation element, it is possible to obtain two advantages. First is that the response speed is quite fast. Second is that the orientation of the liquid crystal shows bistability. The second advantage will be further explained, e.g., with reference to FIG. 9. When the electric field Ea is applied to the liquid crystal molecules, they are oriented in the first stable state 93*a*. This state is stably retained even if the electric field is removed. On the other hand, when the electric field Eb of which direction is opposite to that of the electric field Ea is applied thereto, the liquid crystal molecules are oriented to the second orientation state 93*b* whereby the directions of molecules are changed. Likewise, the latter state is stably retained even if the electric field is removed. Further, as long as the magnitude of the electric field Ea or Eb being applied is not above a certain threshold value, the liquid crystal molecules are placed in the respective orientation states. In order to effectively realize high response speed and bistability, it is preferable that the thickness of the cell is as thin as possible and generally 0.5 to 20 microns, further preferably 1 to 5 microns.

As the bistable liquid crystal used in the liquid crystal apparatus of the present invention, ferroelectric chiral smectic liquid crystals may be most suitably used, of which liquid crystals in chiral smectic C phase (SmC*) or H phase (SmH*) are particularly suited. These ferroelectric liquid crystals may be those described in, e.g., U.S. Pat. Nos. 4,613,209, 4,614,609, 4,622,165, etc.

Further, in the present invention, driving methods as disclosed in, e.g., U.S. Pat. Nos. 4,705,345, 4,707,078, etc. may be used in addition to those described above.

As described hereinabove, according to the present invention, it is possible to effectively prevent the occurrence of flickering which has been encountered in a drive at a low temperature when the drive system is subjected to temperature compensation, i.e., lower frequency drive pulses are used at a lower temperature in order to compensate for a temperature dependence of a liquid crystal, whereby an improvement in display quality can be realized.

What is claimed is:

1. A liquid crystal apparatus, comprising:

a) a liquid crystal device comprising a group of first electrodes, a group of second electrodes intersecting the first electrodes, and a ferroelectric liquid crystal disposed between the group of first electrodes and the group of second electrodes so as to form a pixel at each intersection of the first and second electrodes;

b) first means for sequentially applying a scanning selection signal to the first electrodes;

c) second means for simultaneously applying data signals to the second electrodes in synchronism with the scanning selection signal; and d) third means for controlling the data signals so that a prescribed number of rightmost or leftmost second electrodes is designated among the group of second electrodes to form a marginal region, and other second electrodes among the group of second electrodes are designated to form a display region which forms pixels in a bright state or dark state when supplied with data signals, and said electrodes in the marginal region are supplied with data signals so as to first form a dark state and then form a bright state at the pixels on a particular first electrode under application of the scanning selection signal, thereby (i) forming a bright state in the marginal region including all the pixels formed at the intersections of the first electrodes and the designated prescribed number of second electrodes and (ii) forming a desired display state in the display region including pixels in the bright or dark state depending on given display data signals after the completion of one cycle of scanning of the first electrodes, wherein the bright state at a pixel in the marginal region is identical to the bright state at a pixel in the display region and wherein said data signals applied to the second electrodes in the marginal region include a pulse for forming said bright state in said marginal region, wherein said pulse has a pulse width which is larger than a maximum pulse width of the data signals applied to the second electrodes in the display region.

2. An apparatus according to claim 1, where said third means includes means for designating said prescribed number of rightmost or leftmost second electrodes.

3. An apparatus according to claim 1, wherein said group of second electrodes includes a rightmost or leftmost wider second electrode which has a larger width than other second electrodes.

4. An apparatus according to claim 3, wherein said group of second electrodes includes both a rightmost and a leftmost wider second electrode.

* * * * *

UNITED STATES PATENT AND TRADEMARK OFFICE
CERTIFICATE OF CORRECTION

PATENT NO. : 5,353,137
DATED : October 4, 1994
INVENTOR(S) : AKIRA TSUBOYAMA, ET AL.

It is certified that error appears in the above-identified patent and that said Letters Patent is hereby corrected as shown below:

IN THE DRAWINGS

Sheet 3 of 7, FIG. 4, "SEECTION" should read --SELECTION--.
Sheet 4 of 7, FIG. 5, "FRARME" should read --FRAME--.
Sheet 6 of 7, FIG. 7, "FRARME" should read --FRAME--.

COLUMN 2

Line 66, "milli-meters" should read --millimeters--.

COLUMN 3

Line 55, "$\pm V_I = \pm 6$ V" should read --$\pm V_I = \pm 6$ V Temperature: 25°C.--.

Line 62, "$\pm V_I = \pm 5$ V" should read --$\pm V_I = \pm 5$ V Temperature: 15°C.--.

COLUMN 4

Line 62, "multi-meters" should read --millimeters-- and "centi-meters)" should read --centimeters)--.

Signed and Sealed this

Second Day of May, 1995

Attest:

BRUCE LEHMAN

Attesting Officer

Commissioner of Patents and Trademarks